E. R. MACBETH.
ATOMIZER.
APPLICATION FILED DEC. 13, 1912.
1,134,689.
Patented Apr. 6, 1915.
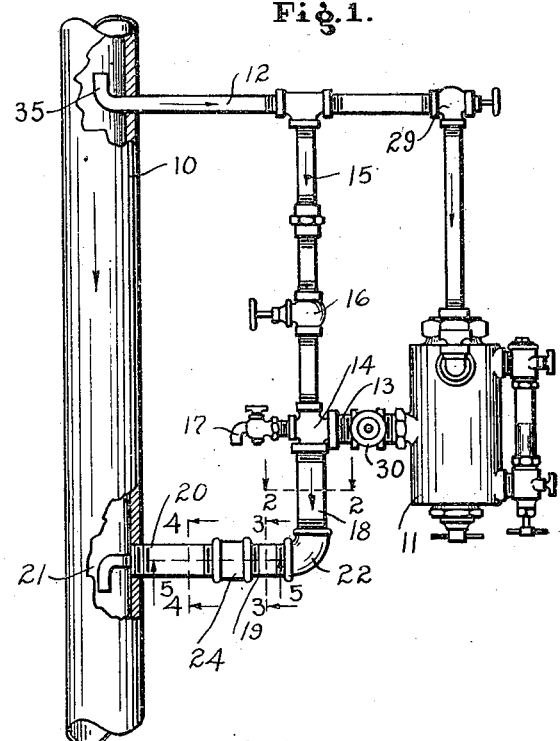
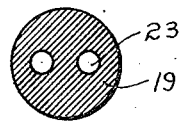
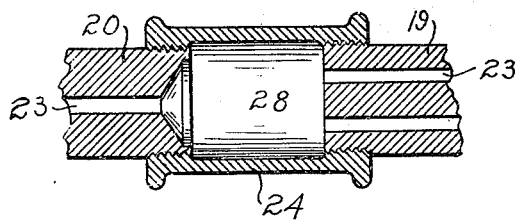
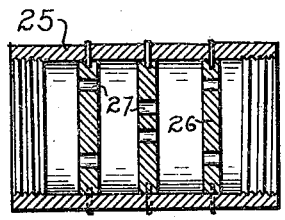
WITNESSES:
A. H. Edgerton.
E. H. Mays.
INVENTOR.
Edgar R. Macbeth.
BY
V. H. Lockwood
ATTORNEY.

UNITED STATES PATENT OFFICE.

EDGAR R. MACBETH, OF BRAZIL, INDIANA.

ATOMIZER.

1,134,689.   Specification of Letters Patent.   Patented Apr. 6, 1915.

Application filed December 13, 1912. Serial No. 736,520.

*To all whom it may concern:*

Be it known that I, EDGAR R. MACBETH, a citizen of the United States, and a resident of Brazil, county of Clay, and State of Indiana, have invented a certain new and useful Atomizer; and I do hereby declare that the following is a full, clear, and exact description thereof, reference being had to the accompanying drawings.

The object of this invention is to provide means in connection with the well known lubricator for introducing the lubricant into the steam pipe line, leading to the engine or other machine which must be lubricated, whereby the lubricant will be broken up into minute particles and thoroughly mixed with the steam for increasing the amount of lubricating work done and decreasing the volume of the lubricant heretofore necessary for lubricating the engine.

The features of the invention will be understood from the accompanying drawings and the following description and claims.

In the drawings, Figure 1 shows my invention in side elevation. Fig. 2 is a transverse section on the line 2—2 of Fig. 1. Fig. 3 is a transverse section on the line 3—3 of Fig. 1. Fig. 4 is a transverse section on the line 4—4 of Fig. 1. Fig. 5, is a longitudinal section on the line 5—5 of Fig. 1. Fig. 6 is a longitudinal section through a modified form of the means for breaking up the oil.

In detail there is shown in the drawing a steam pipe 10 for supplying steam to the engine not shown, and with a lubricator 11 with the usual supply pipe 12 connected to the steam main 10 and with its discharge pipe 13 connected to a cross 14 one of the other connections of which being connected through the pipe 15 and valve 16 with the pipe 12, before mentioned, and with another connection carrying a drain cock 17. The fourth of said connections connects with one of the three breaking up pipes 18, 19 and 20 which are connected in series and the last one connected to a pipe 21 which projects into the steam main 10 and discharges near to the center, where the velocity of the steam passing through the main is the greatest.

As shown, one end of the breaking up pipe 18 is threaded into the T 14 while the lower end is connected to the L 22, and as shown in Fig. 2 there are a number of small conduits 23, some may be large and some may be small, extending longitudinally through said pipe. The breaking up pipe 19 is similar to this except that there are but two of the conduits 23 through it. This breaking up pipe is threaded into the L 22 and into a coupling 24. The breaking up pipe 20 screws into the coupling 24 and the pipe 21 screws into the opposite end thereof. This breaking up pipe has but one longitudinal conduit as shown in Fig. 4. These breaking up pipes are so connected and the conduits 23 through them are so arranged that none of the conduits in one pipe are in alinement with any of the conduits in the next pipe.

The operation of my invention is as follows: Steam from the main 10 passing through the pipe 12 to the lubricator 11 will force some of the lubricant therefrom through the discharge 13 in the usual manner, which lubricant is picked up by the steam flowing through the pipe 15 from the pipe 12 and is carried through the conduits 23 of the breaking up pipes 18. At the end of the pipe 18 this mixture of steam and lubricant passes into the L 22 and is given a slight swirl or turn, due to the shape of the L, and then passes through the openings 23 in the pipe 19 to the space within the coupling 24 and from thence through the single passage in the pipe 20 and through the pipe 21 to the center of the steam main. During the passage through these breaking up pipes 18 to 20 inclusive the lubricant is sub-divided from the big drop, which was fed by the lubricator, into very small particles which are intimately mixed with the steam and which upon being introduced to the center of the steam main will be carried to the engine and perform the desired lubricating work, and being thus finely subdivided, and being introduced into the main where the velocity of the steam is greatest, there will be almost none of the lubricant carried down the sides of the main to be delivered in comparatively large quantities in a few places in the engine as was heretofore the case with the old manner of connecting up the lubricator.

In Fig. 6 is shown a modified form of the breaking up pipes in which a pipe 25 is provided with a plurality of baffle plates 26 with holes 27, through the same, which are staggered with relation to each other. This will perform the same work as far as subdividing the lubricant as will the pipes 18, 19 and 20.

As shown in Fig. 5, the inner end of the pipe 20, within the coupling 24, is centrally tapered toward the passageway 23 to assist slightly in collecting the stream of steam and lubricant, there being a small chamber between the ends of the pipes 19 and 20 within the coupling 24.

By closing the steam valve 16 and the discharge valve 30 from the lubricator and opening the drain cock 17 the normal direction of flow through the breaking up pipes 18, 19, and 29 may be reversed and steam may be blown through them for cleaning out the conduits 23.

To facilitate the discharge of the lubricant into the discharge pipe, the projecting end 21 of pipe 20 may be turned, as shown in Fig. 1, in the direction of flow through the steam supply pipe, as indicated by the arrow. Also in order to induce a stronger circulation through the breaking up pipes 19 and 20, the pipe 12 should preferably lead from a point within the supply pipe 10 and, therefore, the inner end 35 of the pipe 12 is preferably turned toward the flow or in the direction opposite the direction of flow of steam through the supply pipe 10.

I claim as my invention:

1. The combination with a steam supply pipe, a lubricant container, and a discharge therefrom communicating with said supply pipe, of a plurality of conduits in said discharge having the openings therethrough relatively staggered, and a connection to said supply pipe for supplying steam to said conduits for forcing lubricant from said container through said conduits into said supply pipe.

2. The combination with a steam supply pipe, a lubricant container, and a lubricant discharge therefrom, of a pipe, the bore of which is reduced, with one end connecting said steam pipe, a plurality of conduits connected to the other end of said pipe and having openings therethrough in staggered relation, said conduits being connected to said lubricant discharge, and a connection from said supply pipe for supplying steam to said conduits for forcing lubricant from said container through said conduits into said supply pipe.

3. The combination with a steam supply pipe, a lubricant container, and a lubricant discharge therefrom, of a pipe with one end connected with said steam supply pipe, a series of pipes connected with the other end of said supply pipe and having openings therethrough in staggered relation, said series of pipes being connected with said lubricant container discharge, and a connection from said steam supply pipe to said series of pipes, whereby the lubricant from said container will be forced through said staggered openings and will be finely divided and delivered within said steam pipe.

4. The combination with a pipe for conveying steam, a lubricator, a steam connection thereto, and a lubricant discharge therefrom, of a pipe with one end opening substantially within said steam pipe, a series of pipes connected to the other end of said pipe and having openings therethrough in staggered relation, said series of pipes being connected to said lubricator discharge, and a connection from said steam pipe to said series of pipes whereby the lubricant from said lubricator will be forced through said staggered openings for finely dividing the lubricant and delivering it within said steam pipe.

5. The combination with a pipe for conveying steam, a lubricator, a steam connection thereto, and a lubricant discharge therefrom, of a pipe with one end opening substantially within said steam pipe, a series of pipes connected to the other end of said pipe and having openings therethrough in staggered relation, said series of pipes being connected to said lubricator discharge, a connection from said steam pipe to said series of pipes whereby the lubricant from said lubricator will be forced through said staggered openings, finely dividing the same and delivering it within said steam pipe, and valves controlling said connections whereby the normal flow may be reversed and steam blown through said series of pipes for cleaning the openings therethrough.

In witness whereof, I have hereunto affixed my signature in the presence of the witnesses herein named.

EDGAR R. MACBETH.

Witnesses:
J. H. WELLS,
O. M. McLAUGHLIN.

Copies of this patent may be obtained for five cents each, by addressing the "Commissioner of Patents, Washington, D. C."